UNITED STATES PATENT OFFICE.

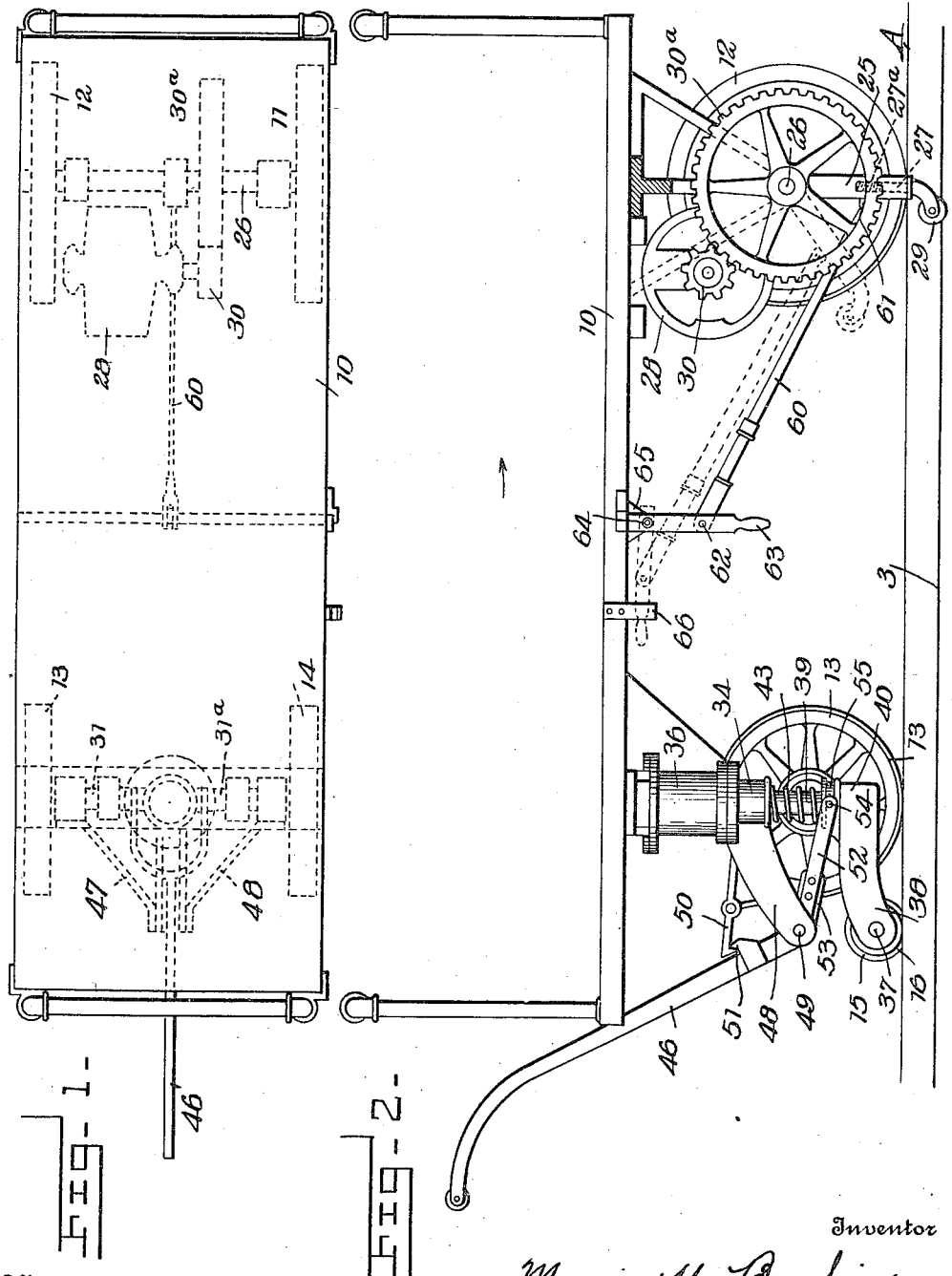

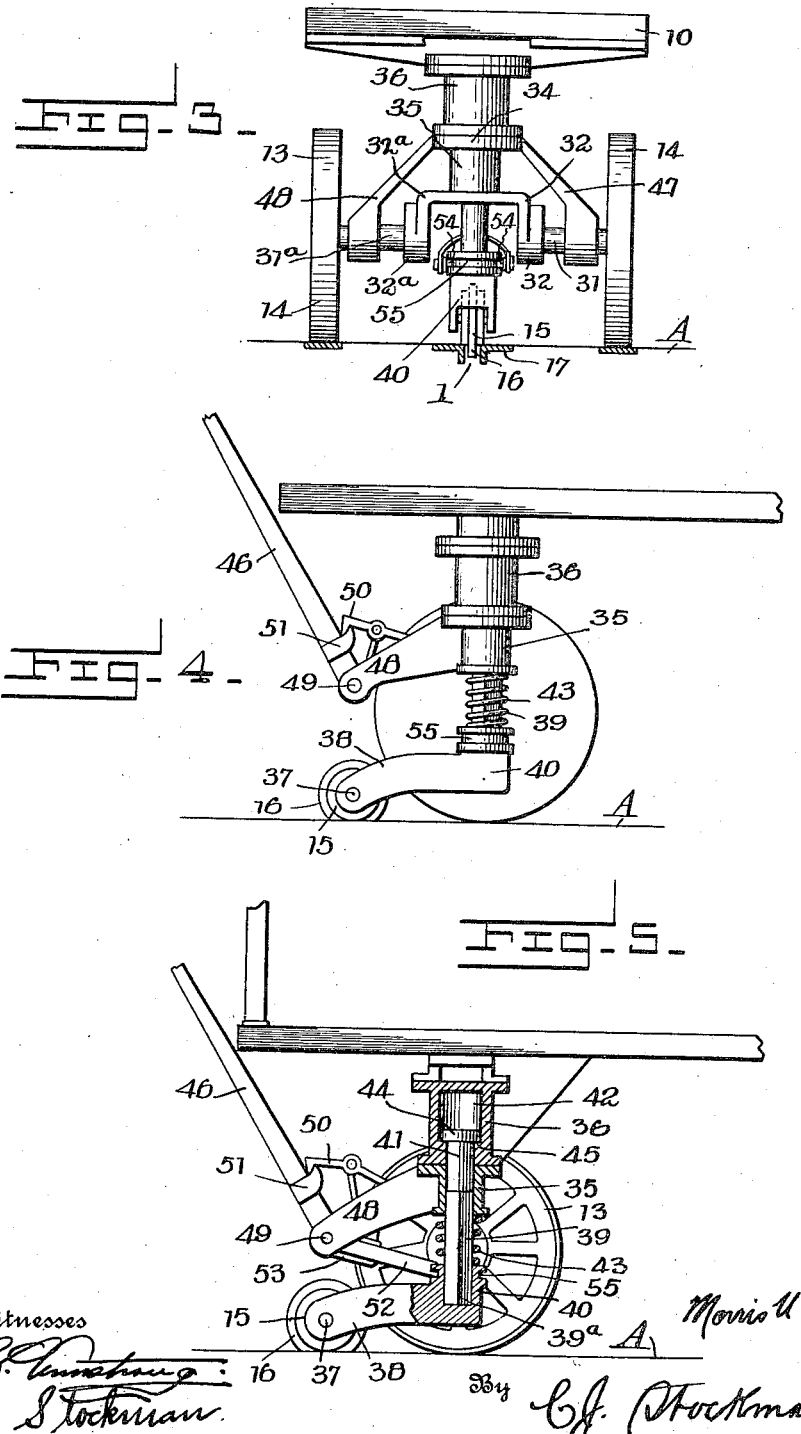

MORRIS U. BERNHEIM, OF CINCINNATI, OHIO, ASSIGNOR TO THE ALVEY-FERGUSON COMPANY, OF OAKLEY, CINCINNATI, OHIO, A CORPORATION OF OHIO.

SYSTEM OF TRANSFERRING FREIGHT AND BAGGAGE.

1,124,273.  Specification of Letters Patent.  Patented Jan. 12, 1915.

Original application filed August 4, 1910, Serial No. 575 511. Renewed June 4, 1914, Serial No. 843,092. Divided and this application filed January 4, 1912, Serial No. 669,467. Renewed June 4, 1914. Serial No. 843,093.

*To all whom it may concern:*

Be it known that I, MORRIS U. BERNHEIM, a citizen of the United States, residing at Cincinnati, in the county of Hamilton and State of Ohio, have invented new and useful Improvements in Systems of Transferring Freight and Baggage, of which the following is a specification.

The invention herein embodied more particularly relates to carriers adapted to systems of transferring freight and baggage of styles such as are disclosed in my application for Letters Patent of the United States filed Aug. 4, 1910, No. 575,511 (renewed June 4, 1914 as Serial Number 843,092) of which the present application is a division and also, in some respects adapted to the systems shown in my application filed June 1, 1909, No. 499,337 (renewed June 4, 1914, Serial Number 843,091) and in my applications filed June 4, 1914 and numbered, serially, 842,950, 842,951 and 842,996, respectively: though it is not my intention to restrict the present invention to its use as an element of said particular systems, as it may be otherwise usefully employed and its employment for all the purposes for which it is adapted and in other systems than the ones hereinbefore referred to is intended to be within the spirit of the invention.

The object of the invention is to provide a truck or carrier having new and useful features which will commend it for use in systems of handling freight, baggage or other matter or things.

In the accompanying drawings there are illustrated what are considered to be the most desirable embodiments of the invention, and it is to be understood that the invention is not restricted to the details of these embodiments as many changes may be made in such details and the invention otherwise variously embodied without departing from its spirit or the scope of the subjoined claims.

Figure 1 is a plan view of a four-wheel truck embodying the present improvements. Fig. 2 is a side elevation of the same. Fig. 3 is a front elevation of the truck with parts omitted. Fig. 4 is a detail view of a truck wherein the guide wheel is not connected with the handle. Fig. 5 is a detail vertical section showing the connection of the guide wheel with the bolster.

In a general way, it may be stated that in the system herein partly illustrated it is intended to transfer freight, baggage or other matter by means of a wheeled carrier which travels upon a way A and is provided with means whereby it may be automatically propelled from an external source of power, the means for applying or delivering said power to the carrier being arranged below the way A and said way having a groove 1 (Fig. 3) which affords access to said means. It is preferred that the power mechanism be of an electrical nature and therefore I have shown a conductor of electricity, 3, within the groove. The groove 1 and the power-applying or delivering means 3 may be arbitrarily considered to be a main line, and, in practice, this main line is tapped at appropriate intervals by branch lines, each formed of another groove and a suitable means for applying or delivering power to the truck, switches being interposed between the main line and branch lines for diverting the truck from or to the main line.

For a more particular description of the part of the system embodying the ways and lines and other parts of the system additional to the carriers, reference may be had to my above noted application renewed June 4, 1914, as Serial Number 843,092: it being considered to be unnecessary to disclose the same in detail herein for the reasons, as already stated, that the present invention relates particularly to the carriers themselves and the carriers may be otherwise employed than as parts of the particular system referred to.

The carrier, except as to features hereinafter particularly described, may be of the usual construction of freight and baggage trucks intended to be manually propelled, and may have any suitable number of supporting wheels.

The invention is herein exemplified upon a truck of the four-wheel type, the wheels at one end thereof being designated 11 and 12, and the wheels at the other end thereof being designated 13 and 14. Associated with the wheels 13 and 14 is a guide wheel 15 having a flange 16 to travel in the groove 1 of the way A, and the remaining portion of the tread is arranged to run upon the way, the latter being, preferably, provided with wear plates 17, 17, which are flush with the surface of the way and are arranged at opposite sides of the groove, to form tracks for said wheel.

A depending guiding means 25 is also arranged at the other end of the truck and is adapted to travel in the groove 1. In the exemplified form of the invention, this guiding means is a sleeve which is preferably suitably connected to the axle 26 upon which the wheels 11 and 12 are mounted, and through it extends an arm 27 the upper end of which is properly electrically connected with an electric motor 28, while the lower end carries the contact element 29 which engages the conductor 3. This contact element is preferably a rotative one, as shown, and the conductor may be either a wire or a rail as desired. The sleeve 25 obviously should be insulated from the arm 27 and it is apparent that any suitable electrical motor may be employed and that suitable electrical connections, whereby the current from the conductor 3 may be availed of to drive the motor, will readily suggest themselves to those persons familiar with such matters. For this reason and for the further reason that it is not my intent herein to restrict myself to an electrically-driven truck, as power derived from any suitable means or source not carried by the truck may be employed, I do not consider it necessary particularly to illustrate the construction of the electric motor or the circuit-forming means herein. Power is transmitted from the motor to the driving wheels of the truck in the exemplified form of the invention, through the intermeshing gears 30 and 30ª, but it is evident that other suitable driving connections from the motor may be employed, if preferred.

The element 29 through which the power is applied or delivered is yieldably held to the means from which the power is received, the conductor 3, for example, by a spring 27ª which presses thereagainst and is mounted in the sleeve 25, as shown in dotted lines in Fig. 2.

It is desirable at times to disconnect the truck from the conductor and to propel it manually. The guide sleeve 25 is, therefore, pivotally mounted so that it, and the arm 27 and contact element 29, may be turned into or above the plane of the upper surface of the way. A very desirable means for accomplishing this adjustment is hereinafter described.

The supporting wheels 13 and 14 are mounted on separate axles 31 and 31ª respectively. These axles are journaled in lugs 32 and 32ª respectively, projecting from a bolster 34. This bolster is mounted to turn pivotally with reference to the truck platform in order that the wheels 13 and 14 may conform in their movements to the bends in the guiding grooves of the way. The means whereby its movements are controlled by said grooves comprises a sleeve 35 which partakes of the movement of the bolster and is mounted in registering position with a second sleeve 36 which is secured to the frame or platform of the truck. The guide wheel, 15 is mounted upon a horizontal axle 37 which is borne by a yoke 38, and a vertical spindle 39 extends from the yoke frame 40, through the sleeve 35 and into the sleeve 36. This spindle has an angular section 39ª and the interior of the sleeve 35 is correspondingly shaped whereby lateral movement communicated to the guide wheel by the bend in the guiding groove will be transmitted to said sleeve, thus turning the bolster. The contacting faces of the sleeves 35 and 36 form substantially a fifth wheel, and the spindle 39 is round at this place, as shown at 41, in order to constitute a pivot for the turning movement. It will be noted that a space 42 is provided in the sleeve 36 for vertical movement of the spindle, which movement takes place during the adjustment of the guide wheel 15 into and out of its operative position. Preferably a spring 43 is provided around the spindle to hold the guide wheel yieldably against the surface of the way. It is also preferred to provide the upper end of the spindle with a head 44 which is seated upon a shoulder 45 in the sleeve 36.

A handle 46 is provided for convenience in the manual propulsion of the truck. This handle is suitably connected with the bolster in order to serve as a means for guiding the truck when the latter is being manually propelled. The illustrated connection consists of a yoke the members of which are designated 47 and 48. To this yoke the lower end of the handle 46 is pivoted at 49 in order that the handle may be turned upward when the truck is being automatically propelled. The handle is held in this position by a pivoted latch 50 and a lug 51.

It is preferred to connect the handle 46 with the guide wheel 15 in such a manner that the latter will be raised to its inoperative position automatically by the lowering of the handle for use. A convenient means for this purpose is illustrated and comprises a fork 52 secured at one end to a projection 53 from the handle, and having the other ends of its arms provided with pins 54 which extend into a groove 55 in the housing or yoke frame 40. This groove 55 is prolonged sufficiently to enable the housing or yoke frame to turn pivotally with the bolster under the control of the guiding groove.

It will be noted that the connection is such that when the handle 46 is lowered the yoke fork 52 and consequently the yokes 38 and the frame or housing 40 will be raised and will correspondingly elevate the guide wheel 15 until the circumferential flange 16 of said wheel is above the plane of the way, and that when the handle is raised the spring 43 will press the guide wheel and its supporting elements downward and hold said wheel in operative position, the latch 50 and lug 51 acting to hold the handle up, whereby accidental raising of the guide wheel is prevented.

While I regard this adjusting of the guide wheel as desirable, yet it is not wholly essential, and connection of the handle with the guide wheel for the purpose of adjusting the latter may be omitted. In this case the guide wheel may be adjusted by a separate instrumentality, or it may be permitted to run on the surface of the way while the truck is being manually propelled, as desired. This is indicated in Fig. 4, which exemplifies a construction otherwise similar to that shown in Figs. 1 and 5.

The means for adjusting the sleeve 25 and the arm 27 and contact element 29, preferably employed, comprises a link 60 pivoted at one end to the sleeve, at 61, and having its other end pivoted at 62 to a handle 63 which depends from the underside of the platform 10 of the truck and is pivoted at 64 to a bracket 65. A catch 66 is employed to engage the handle 63 when the latter is in its raised position and thereby serves to hold the parts in their inoperative position, as shown in dotted lines in Fig. 2.

When the truck is being automatically propelled the best results are secured with the guiding and contact element 25, 29 at the front end and the guiding element 15 at the rear end, and hence it should be understood that when the truck is being automatically propelled it moves in the direction of the arrow shown in Fig. 2. While being manually propelled the end of the truck at which the handle 46 is arranged is preferably the front end of the truck, the truck in this instance being propelled in a direction contrary to that indicated by said arrow.

Having thus described the invention, what I believe to be new and desire to secure by Letters Patent, is:—

1. A carrier provided with supporting wheels and a guiding wheel, said guiding wheel having a flange adapted to run in a guiding groove, and means exerting a yielding downward pressure on the guiding wheel.

2. A carrier having supporting wheels, a pivoted supporting means for the supporting wheels and a guiding wheel adapted to traverse a guiding groove and connected with said supporting means for directing the movement of the latter.

3. A carrier having supporting wheels, a pivoted bolster carrying said wheels, an angular shaft fitted to an opening in the bolster and a guiding means carried by the shaft.

4. In a system of the class described, a carrier having supporting wheels, a pivoted supporting means therefor, a guiding wheel, and connections between the guiding wheel and supporting means, held against axial movement and adapted to be raised and lowered relatively to the supporting means.

5. In a system of the class described, a carrier having supporting wheels, a pivoted supporting means therefor, a guiding wheel, connections between the guiding wheel and supporting means, held against axial movement and free to rise and fall relatively to the supporting means, and a spring pressing the guiding wheel downward.

6. A carrier having supporting wheels, a pivoted bolster carrying said wheels, an angular shaft fitted to an opening in the bolster and a guiding wheel carried by the shaft and provided with a spring for pressing it yieldably downward, the shaft being adapted to move longitudinally in the bolster.

7. A carrier provided with supporting wheels and having means by which it may be power driven, the carrier also having a guiding element adapted to a groove in the way upon which the carrier runs, connections between said guiding element and supporting wheels for directing the movement of the latter, and means for adjusting the guiding element into and out of operative position.

8. A wheeled carrier having a handle by which it may be manually propelled and also having means by which it may be power-driven, the carrier further having a guiding element and connections between the handle and guiding element whereby the latter is automatically adjusted when the handle is moved.

9. A wheeled carrier having a handle by which it may be manually propelled and also having means by which power to drive the carrier may be delivered thereto from an external source, the carrier further having a guiding element adapted to travel in a groove in the way upon which the carrier runs and connections between the handle and guiding element whereby the latter is adjusted when the handle is moved.

10. A carrier provided with supporting wheels and having means by which it may be power driven, the carrier also having a guiding element adapted to a groove in the way upon which the carrier runs, said guiding element having a support which is mounted for pivotal movement on a vertical axis and also for movement toward and from such way, connections between the guiding element and supporting wheels for directing the movement of the latter, a handle and connections between the handle and said support, adapted to move the latter when the handle is moved.

11. A carrier provided with supporting wheels and having means by which it may be power driven, the carrier also having a guiding element adapted to a groove in the way upon which the carrier runs, said guiding element having a support which is mounted for pivotal movement on a vertical axis and also for movement toward and from such way, said support having a groove, connections between the guiding element and supporting wheels for directing the movement of the latter, a pivoted handle, a yoke secured to the handle and having pins extending into the groove of said support, and a spring for moving the support in opposition to the handle and yoke.

12. In a system of the kind described, a wheeled carrier having means whereby it may be propelled automatically and a handle by which it may be propelled manually, a guiding means for said carrier, adapted to direct the movement of its wheels, said guiding means including an element by which the motion of the carrier is automatically directed and connections between the handle and said element whereby said element is moved relatively to its guiding means when the handle is moved.

13. A freight or baggage truck having supporting wheels, a guiding element having connection with said means, mechanism whereby the truck is automatically propelled, means acting upon said guiding element to direct its movement, a handle whereby the truck may be manually propelled and connections between the guiding element and the handle whereby the latter is disconnected from its guiding means when the handle is moved to operative position.

14. In a system of the kind described, a way having a groove, a wheeled truck adapted to travel on said way and provided with a guiding element which extends into the groove, means for propelling the truck upon the way, and a handle by which the truck may be manually propelled having connection with the guiding element for moving the same relatively to the groove.

15. In a system of the kind described, a way having a groove, a wheeled truck adapted to travel on said way and provided with a pivoted bolster which supports its wheels, a guiding element adapted to engage said groove, and having an angular shaft fitted to said bolster, means for propelling the truck automatically upon the way, a spring which yieldingly holds the guiding element in engagement with the groove, a handle, and connections between the handle and guiding element for disconnecting the former from the groove.

16. In a system of the class described, a grooved way, a carrier having supporting wheels, a pivoted supporting means for the supporting wheels, and a guiding wheel connected with the pivoted supporting means and running in the groove of the way.

17. In a system of the class described, a way, a carrier having supporting wheels adapted to run on the way, means for propelling the carrier, and means for directing the travel thereof, comprising a guiding wheel and a pivotally mounted supporting means therefor, connected with the supporting wheels, the way having a track which acts on the guide wheel.

18. In a system of the class described, a grooved way, a carrier having supporting wheels which engage the way, a guiding wheel having a flange which is adapted to run in the groove in the way, guiding connections between said guiding wheel and the supporting wheels, and means for propelling the carrier over said way.

19. In a system of the class described, a grooved way, a carrier having supporting wheels which engage the way, a pivoted supporting means for the wheels, a guiding wheel having a flange which is adapted to run in the groove in the way, connections between the guiding wheel and supporting means, said connections being movable longitudinally and held against axial movement relatively to said supporting means, a spring for pressing the guiding wheel yieldingly downward, and means for propelling the carrier over the way.

20. In a system of the class described, a carrier having a handle at one end by which it is manually propelled, a traveler for propelling it mechanically, the carrier and traveler having means which engage each other during the mechanical propulsion of the carrier and are disconnectible for manual propulsion of the latter, supporting wheels for the carrier, and a guiding means therefor, including a guiding wheel, a pivoted connection between the guiding wheel and supporting wheels, said guiding wheel being free to rise and fall, and a spring for pressing it yieldingly downward.

21. In a system of the class described, a carrier having a handle at one end by which it is manually propelled, a traveler for propelling it mechanically, the carrier and traveler having means which engage each other during the mechanical propulsion of the carrier and are disconnectible for manual propulsion of the latter, supporting wheels for the carrier, and a guiding means therefor, including a guiding wheel, a pivoted connection between the guiding wheel and supporting wheels, said guiding wheel being free to rise and fall, a spring for pressing it yieldingly downward and a way which supports the supporting wheel and has means for guiding the guiding wheel.

22. In a system of the class described, a way having a groove, a traveling propeller in operative relation with the groove, a carrier having a handle at one end and provided with supporting wheels adapted to travel on the way and with a guiding wheel, said guiding wheel having a flange which travels in the groove, a pivoted connection between the guiding wheel and the supporting wheels, the guiding wheel being free to rise and fall and through said connection to turn the supporting wheels, a spring which yieldably presses the guide wheel downward, means projecting from the carrier into the groove and engaging the propeller, said means being adjustable to a place above the surface of the way and transmitting movement of the propeller to the carrier when in operative position.

In testimony whereof I have hereunto set my hand in presence of two subscribing witnesses.

MORRIS U. BERNHEIM.

Witnesses:
 E. PALMER BERNHEIM,
 OSCAR KOEHLER.